(12) United States Patent
Nilsson et al.

(10) Patent No.: US 11,608,606 B2
(45) Date of Patent: Mar. 21, 2023

(54) METHOD AND CONTROL UNIT FOR GROUND BEARING CAPACITY ANALYSIS

(71) Applicant: Scania CV AB, Södertälje (SE)

(72) Inventors: Mattias Nilsson, Södertälje (SE); Marco Trincavelli, Älvsjö (SE); Samuel Malinen, Stockholm (SE); Magnus Granström, Hägersten (SE); Julien Bidot, Södertälje (SE); Marcello Cirillo, Hägersten (SE)

(73) Assignee: Scania CV AB, Södertälje (SE)

( * ) Notice: Subject to any disclaimer, the term of this patent is extended or adjusted under 35 U.S.C. 154(b) by 280 days.

(21) Appl. No.: 16/476,888

(22) PCT Filed: Jan. 15, 2018

(86) PCT No.: PCT/SE2018/050031
§ 371 (c)(1),
(2) Date: Jul. 10, 2019

(87) PCT Pub. No.: WO2018/135991
PCT Pub. Date: Jul. 26, 2018

(65) Prior Publication Data
US 2019/0360165 A1 Nov. 28, 2019

(30) Foreign Application Priority Data
Jan. 19, 2017 (SE) .................................. 1750044-8

(51) Int. Cl.
*E02D 1/02* (2006.01)
*G05D 1/02* (2020.01)

(52) U.S. Cl.
CPC ............... *E02D 1/022* (2013.01); *G05D 1/02* (2013.01)

(58) Field of Classification Search
CPC ........ E02D 1/022; G05D 1/02; G05D 1/0214; G05D 1/0246; G01C 21/20; G01C 7/04;
(Continued)

(56) References Cited

U.S. PATENT DOCUMENTS

| 7,272,474 | B1 * | 9/2007 | Stentz | G01C 7/04 |
| | | | | 701/26 |
| 8,755,997 | B2 * | 6/2014 | Au | G06V 20/56 |
| | | | | 703/1 |

(Continued)

FOREIGN PATENT DOCUMENTS

| EP | 2 698 299 A1 | 2/2014 |
| JP | 2016-095213 A | 5/2016 |

(Continued)

OTHER PUBLICATIONS

Novelty Search Report dated Jul. 5, 2016.
(Continued)

*Primary Examiner* — Faris S Almatrahi
*Assistant Examiner* — Abdalla A Khaled
(74) *Attorney, Agent, or Firm* — Banner & Witcoff, Ltd.

(57) ABSTRACT

A method (400) and a control unit (210) for ground bearing capacity analysis. The method (400) steps include determining (401) a shape of the terrain segment (130) ahead of a vehicle (100), based on sensor measurements; predicting (402) a distance between a sensor (120) of the vehicle (100) and the ground (110) at the terrain segment (130), before the vehicle (100) moves into the terrain segment (130); measuring (403) the distance between the sensor (120) of the vehicle (100) and the ground (110) when the vehicle (100) has moved into the terrain segment (130); and determining (404) that the terrain segment (130) is to be avoided due to insufficient bearing capacity when the predicted (402) distance between the sensor (120) and the ground (110) exceeds (Continued)

the measured (403) distance between the sensor (120) and the ground (110). Also, a method (600) and control unit (210) for route planning of the vehicle (100) are described.

14 Claims, 7 Drawing Sheets

(58) Field of Classification Search
CPC ............ G01C 21/3804; G01C 21/3461; A01B 69/00; G01N 3/40; G01N 3/24; G01B 21/32

See application file for complete search history.

(56) References Cited

U.S. PATENT DOCUMENTS

| | | | | |
|---|---|---|---|---|
| 2004/0039498 A1* | 2/2004 | Ollis | ............... | G05D 1/024 701/23 |
| 2005/0099276 A1* | 5/2005 | Fujioka | ............... | B60C 23/0408 340/426.33 |
| 2009/0173147 A1* | 7/2009 | Sandomirsky | ......... | E02D 1/022 73/84 |
| 2010/0100268 A1 | 4/2010 | Zhang et al. | ............... | 701/25 |
| 2012/0173090 A1* | 7/2012 | Corcoran | ............ | G06Q 10/063 701/50 |
| 2013/0184944 A1* | 7/2013 | Missotten | ............ | A01D 41/127 701/50 |
| 2016/0375901 A1* | 12/2016 | Di Cairano | ............ | G01C 21/34 701/26 |
| 2018/0059667 A1* | 3/2018 | Kuroda | ..................... | G06F 3/14 |
| 2018/0257657 A1* | 9/2018 | Blank | ............. | B60W 30/18181 |
| 2019/0261550 A1* | 8/2019 | Damme | ............... | A01B 69/008 |

FOREIGN PATENT DOCUMENTS

| | | |
|---|---|---|
| WO | WO 2014/047250 A1 | 3/2014 |
| WO | WO 2016/076320 A1 | 5/2016 |

OTHER PUBLICATIONS

Office Action dated Sep. 22, 2017 in corresponding Swedish Patent Application No. 1750044-8.
International Search Report dated Apr. 6, 2018 in corresponding PCT International Application No. PCT/SE2018/050031.
Written Opinion dated Apr. 6, 2018 in corresponding PCT International Application No. PCT/SE2018/050031.
F.J. Comin et al., "Trafficability Assessment of Deformable Terrain through Hybrid Wheel-Leg Sinkage Detection," Journal of Field Robotics, pp. 1-26 (2016).

* cited by examiner

METHOD AND CONTROL UNIT FOR GROUND BEARING CAPACITY ANALYSIS

CROSS-REFERENCE TO RELATED APPLICATIONS

The present application is a 35 U.S.C. §§ 371 national phase conversion of PCT/SE2018/050031, filed Jan. 15, 2018, the contents of which are incorporated herein by reference which claims priority of Swedish Patent Application No. 1750044-8, filed Jan. 19, 2017, the contents of which are incorporated by reference herein. The PCT International Application was published in the English language.

TECHNICAL FIELD

This document discloses methods and control units, for ground bearing capacity analysis and for route planning of a vehicle, based on the ground bearing capacity analysis.

BACKGROUND

When driving a vehicle, in particular when driving in terrain, on a gravel road or on an otherwise unpaved surface such as in a mining zone, at a construction site or an agricultural development zone, it is important to avoid driving and/or stopping the vehicle in muddy, snowy or otherwise soft soil terrain segments in order for the vehicle not to get stuck.

This problem has conventionally been solved based on the skill, experience and attention of the vehicle driver. Vehicle automation is however a quickly emerging technology. An autonomous vehicle is vulnerable for getting stuck in soft terrain, as it may require costly and time consuming assistance by a tow truck. In some environments, it may be very difficult or even impossible for a human to rescue the stuck vehicle, e.g. in deep mines, when driving in radioactive environments, in a war zone, on an extra-terresial planet, etc. The vehicle may also block the passage for other vehicles while it is stuck. Thus, in order to uphold a high usage efficiency of the vehicle and avoiding towing, it is desired to detect such muddy or snowy terrain segments for avoiding driving there, or at least avoiding stopping there, as the vehicle may risk to get stuck.

Document US2009173147 describes a concept of automatic soil strength measurements from a vehicle. Sensors are mounted on the vehicle and configured to measure distances from the sensors to the soil surface and from the sensors to a track made in the soil by the vehicle. The track depth in the soil may thereby be determined, which is regarded as an indicator of the soil softness.

According to this known method, the vehicle first has to drive into the potentially soft soil segment, in order to detect that the vehicle is sinking down in the soil, i.e. risk to get stuck. The method does not solve the problem of preventing the vehicle from getting stuck by avoiding the soft soil segment. The document does not relate to autonomous vehicles at all. No cooperation with other vehicles for helping each other to avoid muddy segments is made.

Document WO2016076320 concerns an autonomous tractor which is estimating soil softness by measuring the distance to the ground and determining how much the wheels have sunk into the soil. When a soft soil segment is detected, its position is determined and the position of the soft soil segment is stored in a database in the vehicle.

This solution has the same disadvantage as the previously discussed method, i.e. the vehicle first has to drive into a mudhole and get stuck before it could be determined that the soil is too soft to allow driving. A proactive/predictive solution, rather than a reactive solution is desirable, as the latter involves costly and time consuming stop and assistance efforts. No cooperation with other vehicles for helping each other to avoid muddy segments is made.

Document EP2698299A1 describes a method for alerting a driver when his/her vehicle is sinking into soft soil or mud. A sensor such as a lidar is used to measure the distance to the soil under the vehicle.

Again, the described solution does not prevent the vehicle from getting stuck, but rather informs the driver that the vehicle is about to get stuck in the soil. This document is not relevant for autonomous vehicles. No cooperation with other vehicles for helping each other to avoid muddy segments is made.

It would thus be desired to be able to detect soft ground areas and provide this information to vehicles, autonomous or not, in order to avoid their getting stuck in soft soil.

SUMMARY

It is therefore an object of this invention to solve at least some of the above problems and improve vehicle route planning.

According to a first aspect of the invention, this object is achieved by use of a control unit for ground bearing capacity analysis. The control unit is configured to: determine a shape of the terrain segment ahead of a vehicle, based on sensor measurements. Further, the control unit is also configured to predict a distance between a sensor of the vehicle and the ground at the terrain segment, before the vehicle moves into the terrain segment. Also, in addition the control unit is further configured to measure the distance between the sensor of the vehicle and the ground when the vehicle has moved into the terrain segment. The control unit is also configured to determine that the terrain segment is to be avoided due to insufficient bearing capacity when the predicted distance between the sensor and the ground exceeds the measured distance between the sensor and the ground.

According to a second aspect of the invention, this object is achieved by a method for ground bearing capacity analysis. The method comprises the steps of determining a shape of the terrain segment ahead of a vehicle, based on sensor measurements. Further, the method additionally comprises the step of predicting a distance between a sensor of the vehicle and the ground at the terrain segment, before the vehicle moves into the terrain segment. The method further comprises the step of measuring the distance between the sensor of the vehicle and the ground when the vehicle has moved into the terrain segment. The method further comprises determining that the terrain segment is to be avoided due to insufficient bearing capacity when the predicted distance between the sensor and the ground exceeds the measured distance between the sensor and the ground.

According to a third aspect of the invention, this object is achieved by a control unit for route planning of a vehicle. The control unit is configured to extract from a database coordinates of a terrain segment to be avoided due to insufficient bearing capacity. The control unit is further configured to plan the vehicle route to a destination of the vehicle, without having to pass through the terrain segment.

According to a fourth aspect of the invention, this object is achieved by a method for route planning of a vehicle. The method comprises the steps of extracting from database coordinates of a terrain segment to be avoided due to insufficient bearing capacity from a database. Also, the method comprises the step of planning the vehicle route to a destination of the vehicle, without having to pass through the terrain segment.

Based on the disclosed aspects, to determine a terrain shape of a ground segment and predict a distance between the sensor and the ground before the vehicle enters the particular ground segment, a comparison may be made immediately between the predicted distance and a real measured distance when approaching the ground segment. A soft soil segment may thereby be detected before driving the vehicle deeply into the soft soil segment, and the vehicle may back out. Further, by determining geographical coordinates of the detected soft soil segment and storing this information in a database, a map may be established. Also, other vehicles may thereby take advantage of the knowledge concerning discovered soft soil segments so that these segments could be avoided. It is thereby possible for a vehicle to get information concerning soft soil segments in the surroundings or along the driving path of the vehicle. This may avoid vehicles getting stuck in soft soil segments, and route planning of the vehicles is improved.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as methods and control units, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are intended to conceptually illustrate the structures and procedures described herein.

Figure 1A:
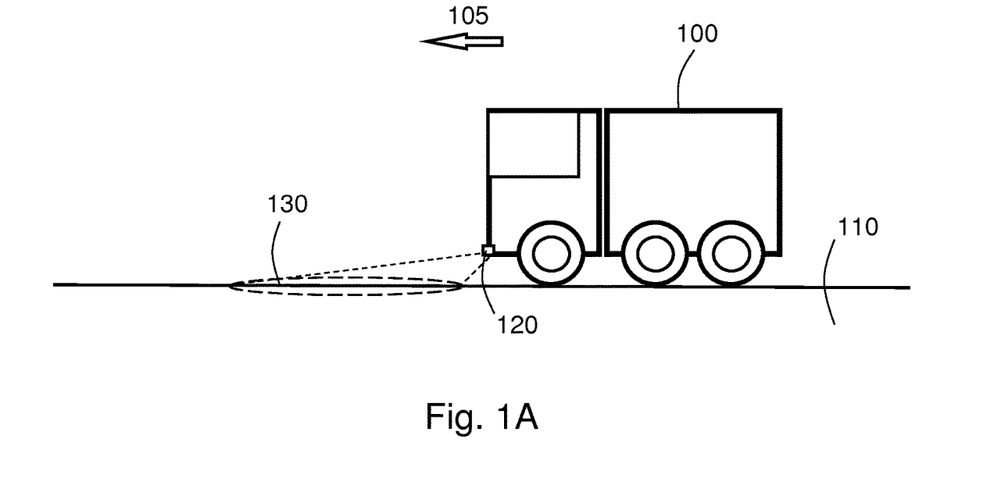
FIG. 1A illustrates a side view of a vehicle according to an embodiment.

FIG. 1A illustrates a scenario with a vehicle 100 driving in a driving direction 105 on ground 110.

The vehicle 100 may comprise means for transportation on the ground in broad sense such as a truck, a car, a trailer, a container, a bus, a motorcycle, an excavator, an explorer vehicle, a walker or other similar manned or unmanned means of conveyance.

The vehicle 100 may be driver controlled or driverless (i.e. autonomously controlled) in different embodiments. However, in this disclosure a certain focus is made on driverless vehicles.

The vehicle 100 comprises at least one sensor 120. The sensor 120 may comprise e.g. a camera, a stereo camera, an infrared camera, a video camera, a radar, a lidar, a 3D sensor, an ultrasound device, a time-of-flight camera, or similar device, in respective different embodiments. The vehicle 100 may comprise one or more sensors 120 of the same or different types. An advantage of having a plurality of sensors 120 is that redundancy is created. The method may then be performed also when one of the sensors 120 is obscured e.g. with dirt, or is malfunctioning. An advantage of having a plurality of sensors 120 of different types is that advantages of each sensor type may be exploited; radar, IR camera and/or ultrasound device may be used in darkness, fog, steam or other low-visibility conditions while a camera may be used in daylight with good result; a stereo camera or 3D camera may be utilized for determining distance to an object, etc.

The sensor 120 may be forwardly directed in some embodiments. In the illustrated embodiment, which is merely an arbitrary example, the forwardly directed sensor 120 may be situated e.g. at the front of the vehicle 100, behind the windscreen of the vehicle 100.

Mounting the forwardly directed sensor 120 behind the windshield has some advantages compared to externally mounted camera systems. These advantages include the possibility to use windshield wipers for cleaning and using the light from headlights to illuminate objects in the camera's field of view. It is also protected from dirt, snow, rain and to some extent also from damage, vandalism and/or theft. Such a sensor 120 may also be used for a variety of other tasks. However, the sensor 120 may be mounted e.g. at the front of the vehicle 100, or under the vehicle 100 in different embodiments.

In case the vehicle 100 detects that the ground 110 is very soft, either from its sensors 120 or from a map, a server, or from another vehicle, a route planning algorithm in the vehicle 100 may discourage driving and/or stops inside the soft area. So, rather than going in a straight line, for instance, and then stopping, the route planning algorithm may plan another path that is longer but does not include a stop, in some embodiments.

The soft ground detection may be made by the sensor 120, e.g. a 3D sensor. A shape of the ground 110 at a terrain segment 130 ahead of the vehicle 100 may be determined by the sensor 120. Further, it may be deduced at what height the sensor 120 should have above the ground 110 at the terrain segment 130, when driving on top of the measured road shape.

Figure 1B:
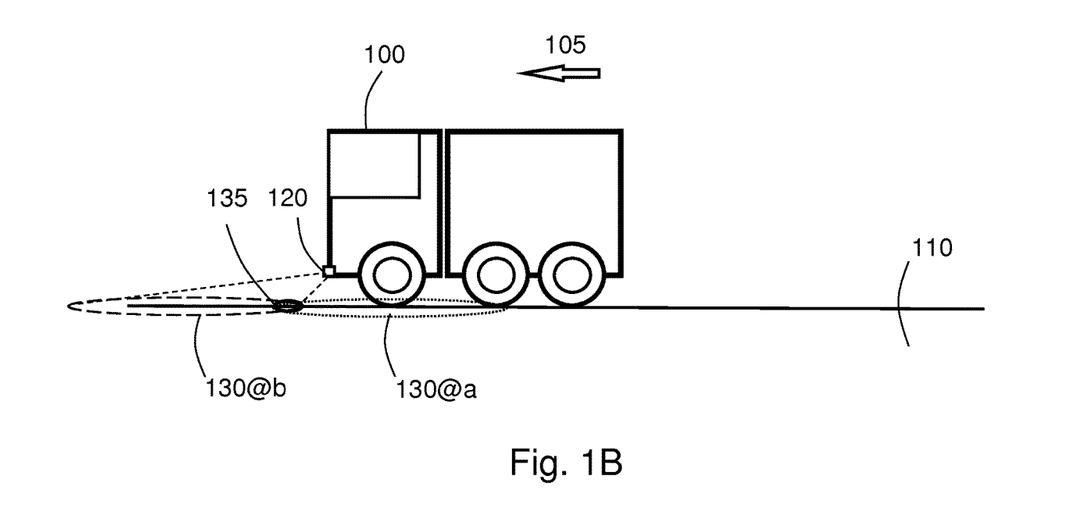
FIG. 1B illustrates yet a side view of the vehicle according to an embodiment.

FIG. 1B illustrates a situation where the vehicle 100 has driven forward in the driving direction 105, into the terrain segment in question. The sensor 120 then determines the distance to the ground 110. The sensor 120 may measure distances in the same direction continuously on both occasions, i.e. at the situation depicted in FIG. 1A and the s situation depicted in FIG. 1B.

Further, based on the first measurement (in the situation of FIG. 1A) of the terrain segment 130@ time a, a prediction may be made of the distance to the ground at a future position at terrain segment 130. By comparing the currently measured distance (in the situation of FIG. 1B) between the sensor 120 and the terrain segment 130@ time b with the prediction based on the first measurement (in the situation of FIG. 1A), it may be determined that the vehicle 100 has sunk into the ground 110.

While the vehicle 100 is driving forward in the driving direction 105, an area overlap 135 is created between the terrain segment 130@ time a and the terrain segment 130@ time b. Two measurements, made at two different moments in time, are thereby provided. In case the two measurements do not coincide, it may be determined that the wheels of the vehicle 100 have sunk into the ground 110.

If at least one of the wheels of the vehicle 100 has sunk into the ground 110, the measured height from the sensor 120 to the ground 110 is less than it should have been if the wheels had been on top of the ground 110. It may then be deduced that the ground 110 is soft. With the help of axle load and wheel shape one can also calculate how soft the ground 110 is. This may then be included in a local map of the vehicle 100 and also may be reported via a wireless communication interface to the cloud, i.e. a server, so that other vehicles can avoid the detected soft ground 130.

In some embodiments, the current measurement (in the situation of FIG. 1B) and the prediction based on the previously made measurement (in the situation of FIG. 1A), may be made based on the speed and/or directional orientation of the vehicle 100. The speed of the vehicle 100 may be determined by a speedometer of the vehicle 100, by a satellite based geographical positioning system and/or by another sensor on board the vehicle 100, such as an accelerometer, in different embodiments. The direction of the vehicle 100 may be measured by a gyro or an inertial navigation systems in different embodiments.

The risk of vehicles 100 in the area getting stuck is thereby eliminated, or at least reduced.

Figure 1C:
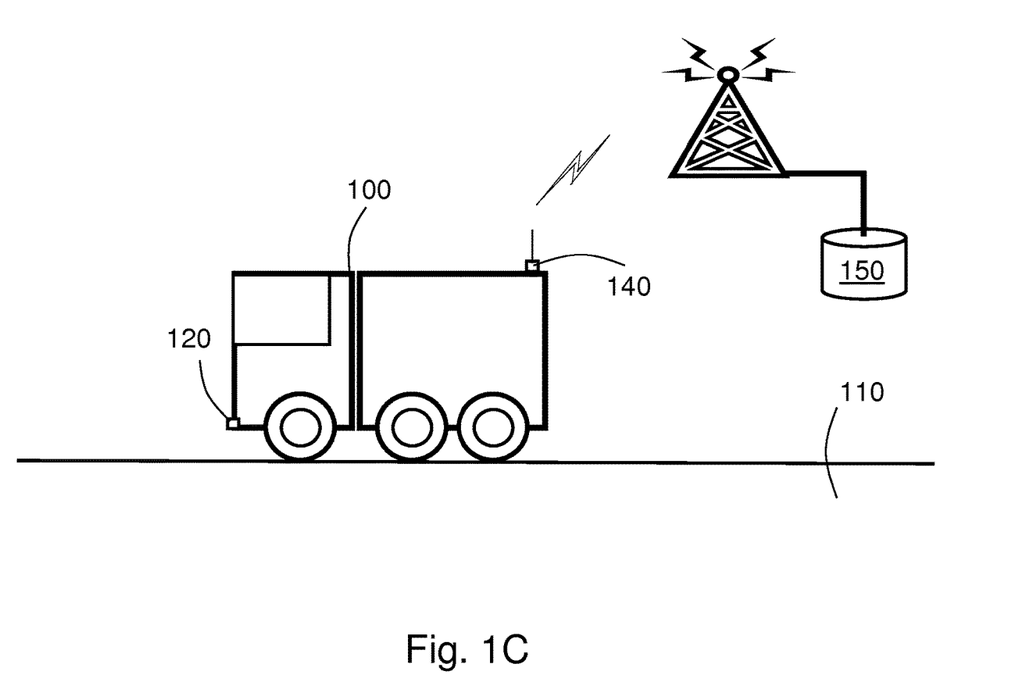
FIG. 1C illustrates another side view of the vehicle according to an embodiment

FIG. 1C depicts a situation where the vehicle 100 comprises a wireless communication device 140 which communicates via a wireless communication interface with a database 150, which may be situated in a vehicle external structure, frequently referred to as a central server location or cloud.

The wireless communication device 140 may be configured for wireless communication over a wireless communication interface, such as e.g. Vehicle-to-Vehicle (V2V) communication, or Vehicle-to-Structure (V2X) communication.

In some embodiments, the communication between the vehicle 100 and the vehicle external structure comprising the database 150 may be performed via V2V communication, e.g. based on Dedicated Short-Range Communications (DSRC) devices. DSRC may operate in 5.9 GHz band with bandwidth of 75 MHz and have an approximate range of 1000 m in some embodiments.

The wireless communication may be made according to any IEEE standard for wireless vehicular communication like e.g. a special mode of operation of IEEE 802.11 for vehicular networks called Wireless Access in Vehicular Environments (WAVE). IEEE 802.11p is an extension to 802.11 Wireless LAN medium access layer (MAC) and physical layer (PHY) specification.

Such wireless communication interface may in some alternative embodiments comprise, or be suggested by wireless communication technology such as Wi-Fi, Wireless Local Area Network (WLAN), Ultra Mobile Broadband (UMB), Bluetooth (BT), Near Field Communication (NFC), Radio-Frequency Identification (RFID), Z-wave, ZigBee, IPv6 over Low power Wireless Personal Area Networks (6LoWPAN), Wireless Highway Addressable Remote Transducer (HART) Protocol, Wireless Universal Serial Bus (USB), optical communication such as Infrared Data Association (IrDA) or infrared transmission to name a few possible examples of wireless communications in some embodiments.

The communication may alternatively be made over a wireless interface comprising, or suggested by radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), or similar, proposing a few options, via a wireless communication network.

When the vehicle 100 has detected the terrain segment 130 having soft soil of insufficient bearing capacity, the vehicle 100 may avoid driving into the terrain segment 130, e.g. by making a route plan avoiding the detected terrain segment 130, or by outputting an alert, in case the vehicle 100 is operated by a driver. Such an alert may be provided as an alerting sound via a loudspeaker, a light signal via a diode, a lamp or similar device, and/or a haptic signal via a tactile device. Such an alerting device may comprise e.g. a mobile telephone, a computer, a computer tablet, a display, a loudspeaker, a projector, a head-up display, a display integrated in the windshield of the vehicle 100, a display integrated in the dashboard of the vehicle 100, a tactile device, a portable device of the vehicle driver, intelligent glasses of the vehicle driver, etc.; or a combination thereof, in some embodiments.

Further, in some embodiments, the vehicle 100 may determine the coordinates of the detected terrain segment 130 and provide them to the database 150 in order to establish a map comprising coordinates of soft soil terrain segments 130. The map in the database 150 may comprise information provided by a plurality of vehicles, e.g. all vehicles at a certain site, such as a construction site; all vehicles of the same owner; all vehicles of the same brand; all vehicles of the same category; all vehicles within a certain distance, etc.

Further, the vehicle 100 in some embodiments may download the map, or a subset thereof, from the database 150. The vehicle 100 may thereby avoid driving into soft soil terrain segments 130 that have been detected by other vehicles. This is further discussed and explained concerning FIG. 2.

Figure 2:
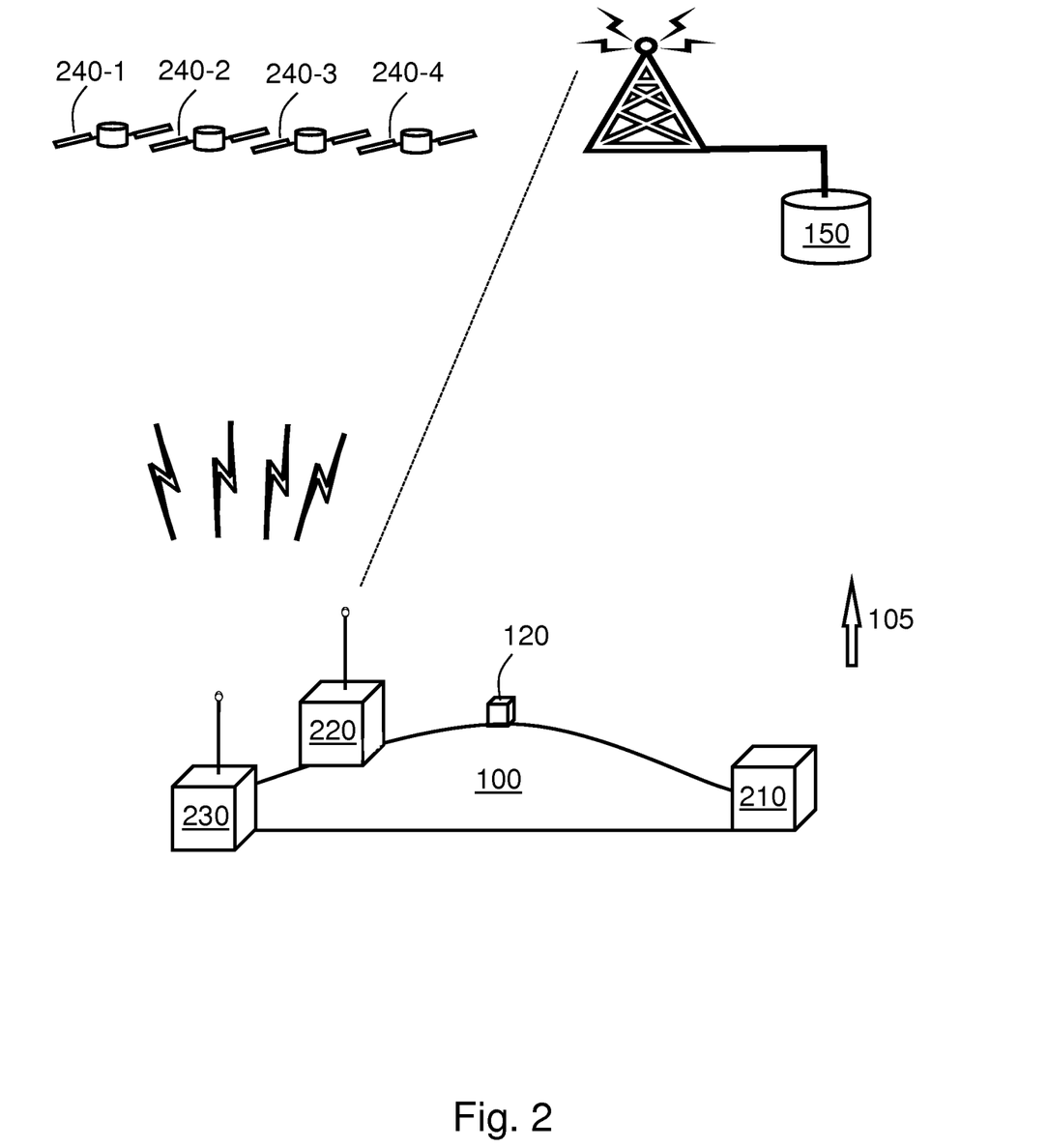
FIG. 2 illustrates an example of a vehicle interior according to an embodiment.

FIG. 2 illustrates an example of how the previous situation in FIG. 1C may be perceived by a driver of the vehicle 100, if any, when situated at any arbitrary position along the route towards a destination, according to an embodiment.

A control unit 210 may be configured for planning the route of the vehicle 100, from the current position of the vehicle 100, to its destination, in some embodiments, while detecting and avoiding soft soil segments 130; and for detecting soft soil segments 130 and reporting information concerning the detected soft soil segment 130 to a database 150.

This information may be stored in the database 150, associated with geographical position coordinates and possibly a date/time when the soft soil segments 130 were detected. By adding date/time of detection, an aging functionality may be applied according to some embodiments, i.e. the soft soil segment 130 may be considered permissible for passage/stop after a predetermined or calculable time period, such as e.g. some months.

The communication between the control unit 210 and the database 150 of the vehicle external structure may be made by a communication device 220. The communication device 220 may be configured for wireless communication over a wireless communication interface, such as e.g. Vehicle-to-Vehicle (V2V) communication, or Vehicle-to-Structure (V2X) communication, or any of the previously enumerated communication technologies.

The geographical position of the vehicle 100 and/or the detected soft soil segment 130 may be determined by a positioning device 230 in the vehicle 100, which may be based on a satellite navigation system such as the Navigation Signal Timing and Ranging (Navstar) Global Positioning System (GPS), Differential GPS (DGPS), Galileo, GLONASS, or the like.

The geographical position of the positioning device 230, (and thereby also of the vehicle 100/soft soil segment 130) may be detected continuously with a certain predetermined or calculable time intervals according to various embodiments.

Positioning by satellite navigation is based on distance measurement using triangulation from a number of satellites 240-1, 240-2, 240-3, 240-4. In this example, four satellites 240-1, 240-2, 240-3, 240-4 are depicted. More than four satellites 240-1, 240-2, 240-3, 240-4 may be used for enhancing the precision or for creating redundancy. The satellites 240-1, 240-2, 240-3, 240-4 continuously transmit information about time and date (for example, in coded form), identity (which satellite 240-1, 240-2, 240-3, 240-4 that broadcasts), status, and where the satellite 240-1, 240-2, 240-3, 240-4 are situated at any given time. The GPS satellites 240-1, 240-2, 240-3, 240-4 send information encoded with different codes, for example, but not necessarily based on Code Division Multiple Access (CDMA). This allows information from an individual satellite 240-1, 240-2, 240-3, 240-4, distinguished from the satellite information, based on a unique code for each respective satellite 240-1, 240-2, 240-3, 240-4. This information can then be transmitted to be received by the appropriately adapted positioning device 230 in the vehicle 100.

Distance measurement can, according to some embodiments, comprise measuring the difference in the time it takes for each respective satellite signal transmitted by the respective satellites 240-1, 240-2, 240-3, 240-4 to reach the positioning device 230. As the radio signals travel at the speed of light, the distance to the respective satellite 240-1, 240-2, 240-3, 240-4 may be computed by measuring the signal propagation time.

The positions of the satellites 240-1, 240-2, 240-3, 240-4 are known, as they continuously are monitored by approximately 15-30 ground stations located mainly along and near the earth's equator. Therefore, the geographical position, i.e. latitude and longitude, of the vehicle 100 may be calculated by determining the distance to at least three satellites 240-1, 240-2, 240-3, 240-4 through triangulation. For determination of altitude, signals from four satellites 240-1, 240-2, 240-3, 240-4 may be used according to some embodiments.

The geographical position of the vehicle 100/soft spot 130 may alternatively be determined, e.g. by having transponders positioned at known positions around the vehicle route and a dedicated sensor in the vehicle 100, for recognizing the transponders and thereby determining the position; by detecting and recognising WiFi networks (WiFi networks along the route may be mapped with certain respective geographical positions in a database); by receiving a Bluetooth beacon signal, associated with a geographical position, or other signal signatures of wireless signals such as e.g., by triangulation of signals emitted by a plurality of fixed base stations with known geographical positions. The position of the vehicle 100 may alternatively be entered by the driver, if any, or any robot or other similar entity, loading the vehicle 100.

The various units 210, 220, 230, 120 in the vehicle 100 may interactively communicate with each other via e.g. a wired or wireless communication bus. The communication bus may comprise e.g. a Controller Area Network (CAN) bus, a Media Oriented Systems Transport (MOST) bus, or similar. However, the communication may alternatively be made over a wireless connection comprising, or at least operable by, any of the previously discussed wireless communication technologies.

Figure 3:
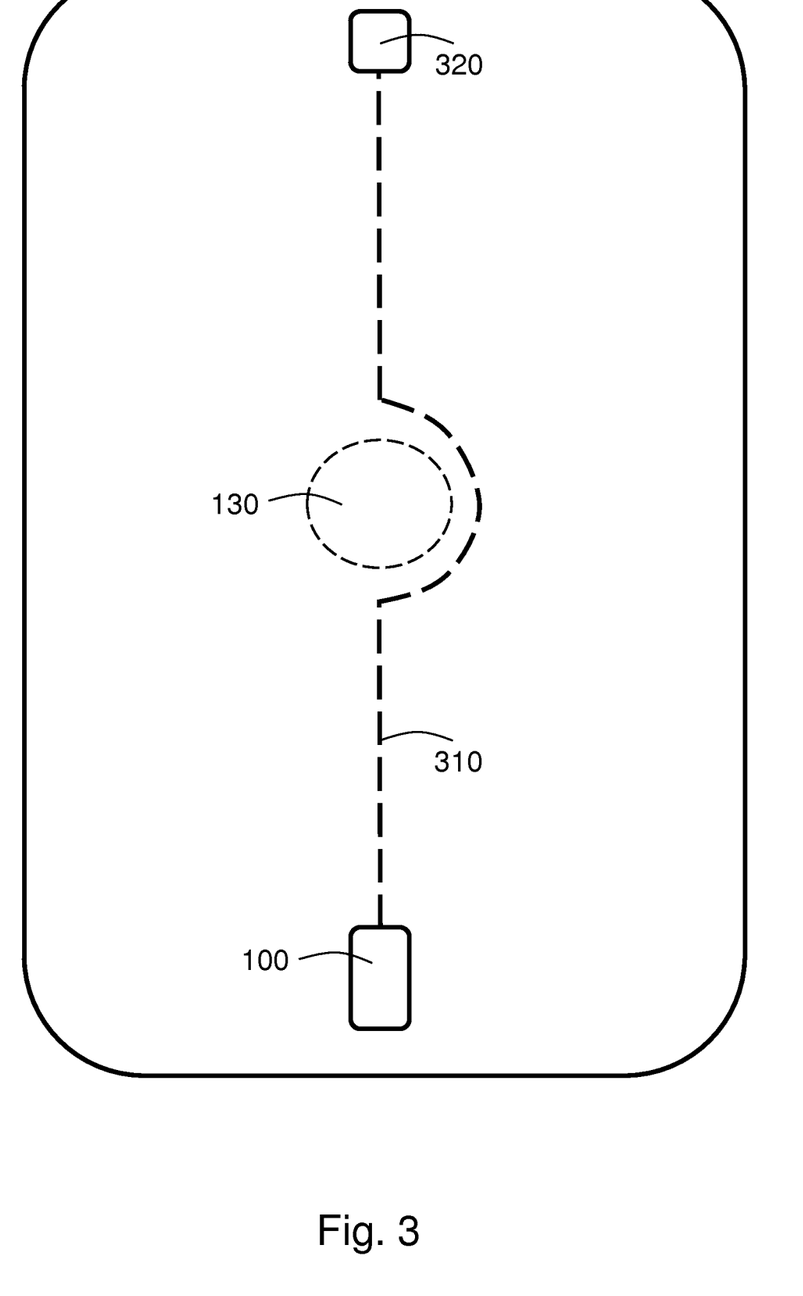
FIG. 3 illustrates an example of a route planning of the vehicle according to an embodiment.

FIG. 3 schematically describes a planned route 310 to a destination 320 of a vehicle 100, while avoiding the soft spot area 130.

The vehicle 100 may obtain from the database 150 a map providing information concerning detected soft terrain segments 130 which are to be avoided. Further, the control unit 210 in the vehicle 100 may plan the route 310 to the destination 320 without the vehicle having to pass and/or stop at any soft terrain segment 130, in some embodiments.

Figure 4:
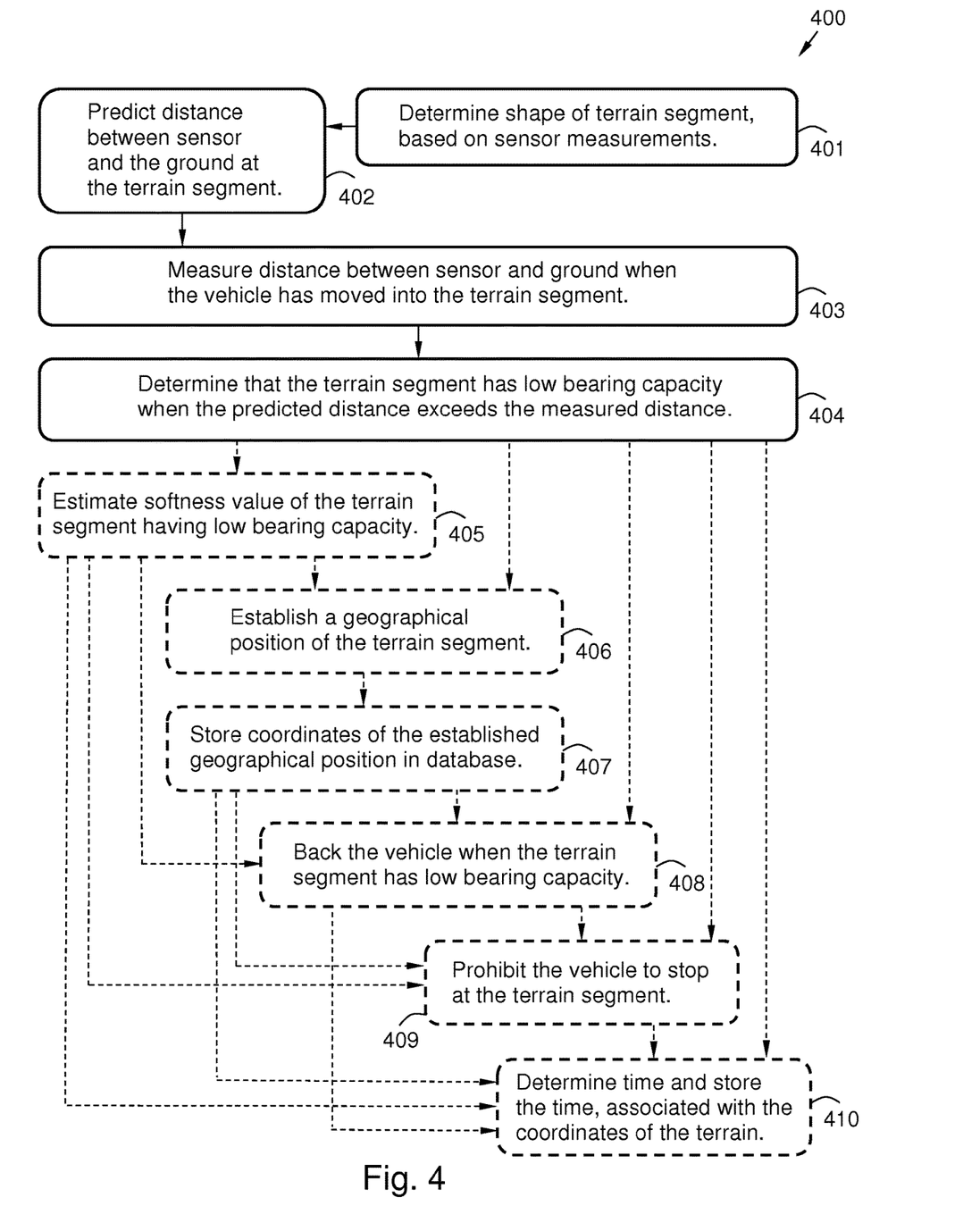
FIG. 4 is a flow chart illustrating an embodiment of a method.

FIG. 4 illustrates an example of a method 400 according to an embodiment. The flow chart in FIG. 4 shows the method 400, for ground bearing capacity analysis of a terrain segment 130.

The vehicle 100 may be any means for conveyance, such as a truck, a bus, a car, or similar. The vehicle 100 may be driven by a driver, or be autonomous in different embodiments.

In order to correctly analyze a ground bearing capability, the method 400 may comprise steps 401-410. However, some of these steps 401-410 may be performed in a different chronological sequence than their numbering in the text suggests. Steps 405-410 may be performed only in some alternative embodiments. The method 400 may comprise the subsequent steps:

Step 401 comprises determining a shape of the terrain segment 130 ahead of the vehicle 100, based on sensor measurements, from at least one sensor 120 in or on the vehicle 100.

Step 402 comprises predicting a distance between the sensor 120 of the vehicle 100 and the ground 110 at the terrain segment 130, before the vehicle 100 moves into the terrain segment 130.

The terrain segment 130 is situated ahead of the vehicle 100, in a driving direction of the vehicle 100.

Step 403 comprises measuring the distance between the sensor 120 of the vehicle 100 and the ground 110 when the vehicle 100 has moved into the terrain segment 130.

Step 404 comprises determining that the terrain segment 130 is to be avoided due to insufficient bearing capacity when the predicted 402 distance between the sensor 120 and the ground 110 exceeds the measured 403 distance between the sensor 120 and the ground 110.

Thus, the ground at the particular terrain segment 130 may be considered to be a soft soil segment, to be avoided by the vehicle 100.

In some embodiments, a threshold limit may be added to the predicted 402 distance; i.e. the vehicle 100 may be allowed to sink down a certain distance, less than the predicted 402 distance in addition to the threshold limit, without concluding that the terrain segment 130 is too soft. This avoids terrain segments 130 being determined to be too soft when the vehicle 100 is estimated to be able to pass/stop on the terrain segments 130 without getting stuck.

Step 405, which may be present only in some alternative embodiments, comprises estimating a softness value of the determined 404 terrain segment 130, based on a difference in size between the predicted 402 distance between the sensor 120 and the ground 110 and the measured 403 distance between the sensor 120 and the ground 110; axle load of the vehicle 100 and wheel shape.

Step 406, which may be present only in some alternative embodiments, comprises establishing a geographical position of the terrain segment 130 determined 404 to be avoided.

The geographical position may be determined by a geographical positioning unit 230, such as e.g. a GPS.

Step 407, may be present only in some alternative embodiments in which step 406 has been performed. It comprises storing coordinates of the established 406 geographical position in a database 150, and associating that with information concerning the insufficient bearing capacity of the terrain segment 130 to be avoided.

In some embodiments, the estimated 405 softness value may be stored and associated with coordinates of the established 406 geographical position in the database 150.

Step 408, which may be present only in some alternative embodiments, comprises backing the vehicle 100 off the terrain segment when it has been determined 404 that the terrain segment 130 is to be avoided.

Step 409, which may be present only in some alternative embodiments, comprises prohibiting the vehicle 100 from stopping at the terrain segment 130, that is determined 404 to be avoided, i.e. the soft soil segment.

Step 410, which may be present only in some alternative embodiments wherein step 406 and step 407 have been performed, comprises determining a moment in time and storing 407 the determined 410 moment in time, associated with coordinates of the established 406 geographical position in the database 150.

In some embodiments, information from the database 150 may be deleted after a predetermined time period has passed from the determined 410 moment in time.

Obsolete information concerning ground conditions may be sorted out, by introducing an aging functionality.

Figure 5:
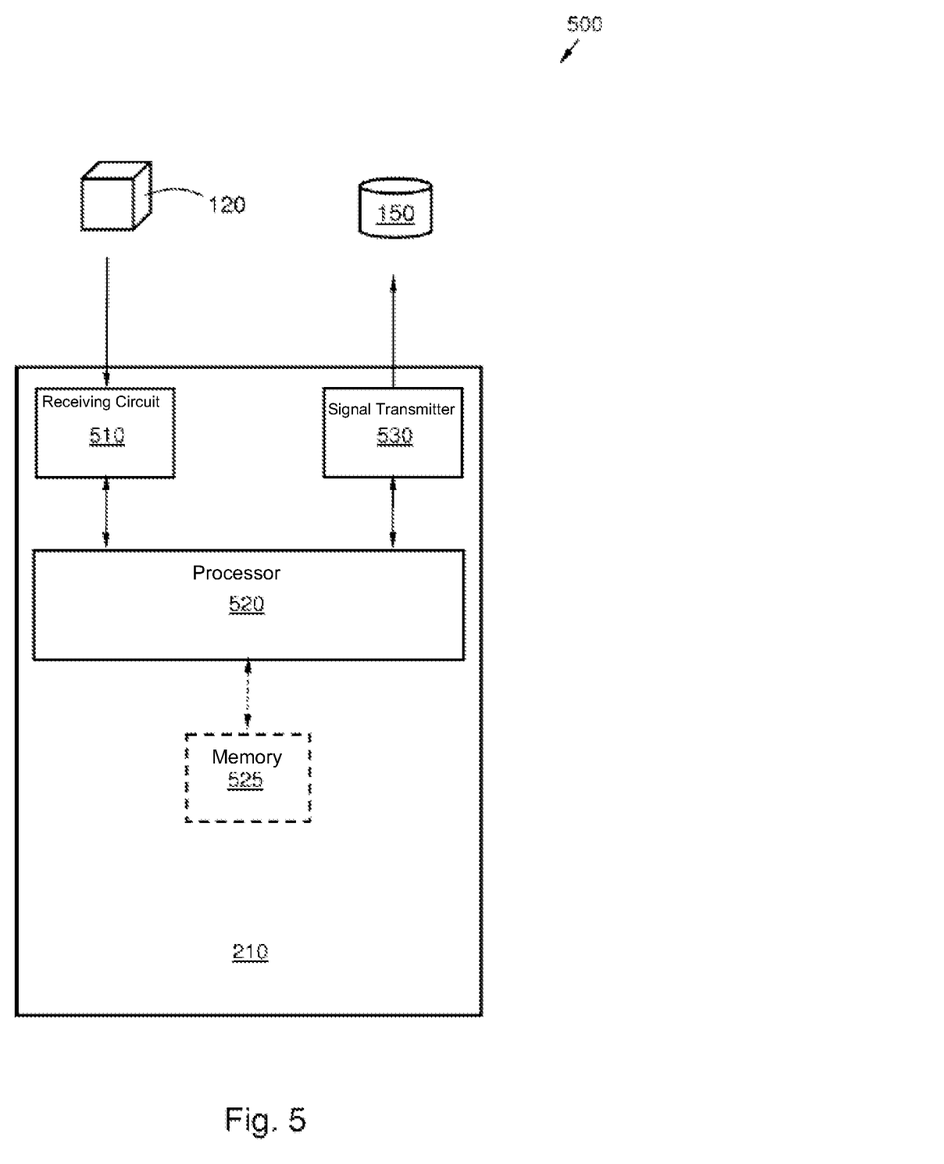
FIG. 5 is an illustration depicting a system comprising a control unit according to an embodiment.

FIG. 5 illustrates an embodiment of a system 500 for ground bearing capacity analysis.

The system 500 comprises a sensor 120 configured to measure a distance. The distance may be the distance from the sensor to the ground 110. The sensor 120 may also be configured to capture sensor information for determining a shape of the terrain segment 130 ahead of the vehicle 100.

Further, the system 500 also comprises a control unit 210. The control unit 210 may perform at least some of the previously described steps 401-410 according to the method 400 or ground bearing capacity analysis described above and illustrated in FIG. 4.

The control unit 210 is configured to determine a shape of the terrain segment 130 ahead of the vehicle 100 based on sensor measurements made by the sensor 120. Further, the control unit 210 is configured to predict a distance between the sensor 120 of the vehicle 100 and the ground 110 at the terrain segment 130 before the vehicle 100 moves into the terrain segment 130. Also, in addition, the control unit 210 is further configured to measure the distance between the sensor 120 of the vehicle 100 and the ground 110 when the vehicle 100 has moved into the terrain segment 130. The control unit 210 is furthermore configured to determine that the terrain segment 130 is to be avoided due to insufficient bearing capacity when the predicted distance between the sensor 120 and the ground 110 exceeds the measured distance between the sensor 120 and the ground 110.

In some embodiments, the control unit 210 may be further configured to establish a geographical position of the terrain segment 130 determined to be avoided. Further, the control unit 210 may also be configured to store coordinates of the established geographical position in a database 150, associated with information concerning the insufficient bearing capacity of the terrain segment 130 to be avoided.

The control unit 210 may also be configured to backup the vehicle 100 when it has been determined that the terrain segment 130 is to be avoided, in some embodiments.

Furthermore, the control unit 210 may be configured to estimate a softness value of the determined terrain segment 130, based on a difference between the predicted distance between the sensor 120 and the ground 110 and the measured distance between the sensor 120 and the ground 110 and the axle load of the vehicle 100 and the wheel shape.

The control unit 210 may in some embodiments be configured to store the estimated softness value associated with coordinates of the established geographical position in the database 150.

Additionally, the control unit 210 may also be configured to prohibit the vehicle 100 from stopping at the terrain segment 130 determined to be avoided, in some embodiments.

The control unit 210 may also be further configured to determine a moment in time and to store the determined moment in time, associated with coordinates of the established geographical position in the database 150. Also, the control unit 210 may be configured to delete information from the database 150 when a predetermined time period has passed from the determined moment in time.

The control unit 210 may also be configured to provide a route plan of the vehicle 100. The control unit 210 may be further configured to extract coordinates of a terrain segment 130 that is to be avoided due to insufficient bearing capacity, from a database 150. Furthermore, the control unit 210 may also be configured to plan the vehicle route 310 to a destination 320 of the vehicle 100, without the vehicle having to pass the terrain segment 130.

In some alternative embodiments, the control unit 210 may be configured to obtain a softness value of each extracted insufficient bearing capacity terrain segment 130 coordinate. Further, according to some alternative embodiments, the control unit 210 may be configured to plan the passage to the destination 320, to allow passing of the insufficient bearing capacity terrain segment 130 coordinate associated with a softness value lower than a threshold limit, but disallowing stopping; and disallowing passing of the insufficient bearing capacity terrain segment 130 coordinate associated with a softness value exceeding the threshold limit.

Further the control unit 210 may also be configured to determine environmental temperature of the vehicle 100. Also, the control unit 210 may be configured to plan the vehicle route 310, allowing passage of the terrain segment 130 to be avoided, when the determined environmental temperature is lower than a threshold temperature limit.

The system 500 furthermore may further, in some embodiments, comprise a geographical positioning unit 230, configured to establish a geographical position of a terrain segment 130.

Further the system 500 also may comprise a database 150, configured to store coordinates of the established geographical position, associated with information concerning the insufficient bearing capacity of the terrain segment 130. The database 150 may be positioned in a vehicle external structure.

The control unit 210 may comprise a processor 520 configured for performing at least some of the previously described steps 401-410 according to the method 400, in some embodiments.

Such processor 520 may comprise one or more examples of a processing circuit, i.e. a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones enumerated above.

The control unit 210 may further comprise a receiving circuit 510 configured for receiving a set of signals from one or more sensors 120 or from the database 150 in different embodiments.

Furthermore, the control unit 210 may comprise a memory 525 in some embodiments. The optional memory 525 may comprise a physical device utilised to store data or programs, i.e., sequences of instructions, on a temporary or a permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 210 may comprise a signal transmitter 530. The signal transmitter 530 may be configured for transmitting signals to be received by the database 150, over a wireless communication interface. The control unit 210 may also in some embodiments be configured to generate and send command signals for controlling the vehicle 100, and/or for triggering an alert, for warning a driver, if any, from driving into a soft soil area.

Figure 6:
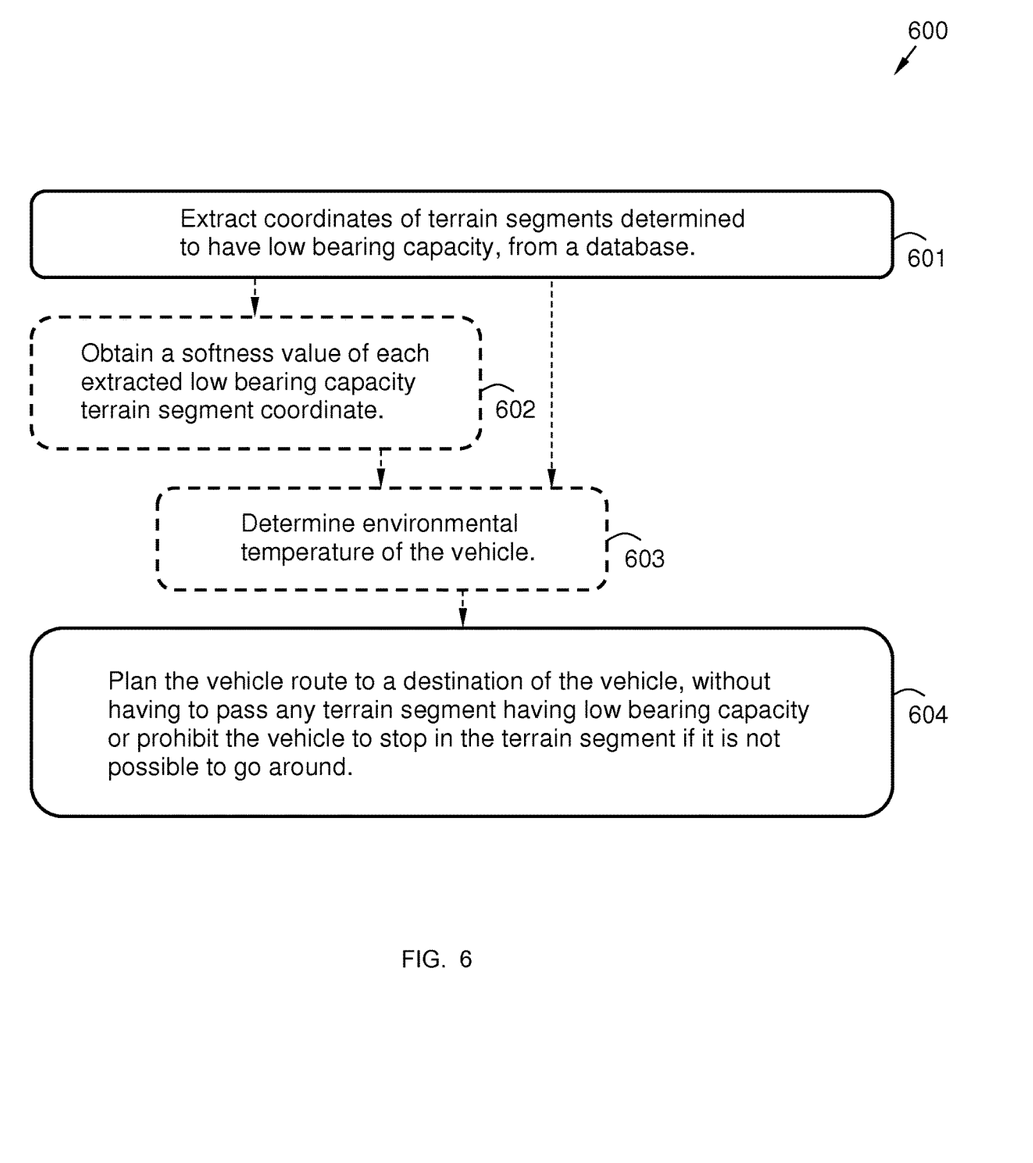
FIG. 6 is a flow chart illustrating an embodiment of another method.

FIG. 6 illustrates an example of a method 600 according to an embodiment. The flow chart in FIG. 6 shows the method 600, for route planning of a vehicle 100.

The method 600 may be implemented in the control unit 210 in the above described vehicle 100.

In order to correctly analyze ground bearing, the method 600 may comprise a number of steps 601-604. However, some of these steps 601-604 may be performed in a somewhat different chronological sequence than the numbering suggests. Steps 602-603 may be performed only in some alternative embodiments. The method 600 may comprise the subsequent steps:

Step 601 comprises extracting coordinates from a database 150 of a terrain segment 130 to be avoided due to insufficient bearing capacity.

In some embodiments, only coordinates of a terrain segment 130 to be avoided which are situated within a predetermined distance in the driving direction 105 of the vehicle 100 may be extracted. Thereby, less data and information has to be downloaded and stored, which saves communication resources and processing power.

Step 602, which may be provided only in some alternative embodiments, comprises obtaining a softness value of each extracted 601 insufficient bearing capacity terrain segment 130 coordinate.

The softness value may be a value on a scale, e.g. from 1 to 10; from −7 to +15, mentioning some arbitrary examples.

Step 603, which may be present only in some alternative embodiments, comprises determining environmental temperature of the vehicle 100.

The environmental temperature of the vehicle 100 may be determined by a thermometer in the vehicle 100; or a vehicle external thermometer in combination with geographical positioning of the vehicle 100.

Step 604 comprises planning a vehicle route 310 to a destination 320 of the vehicle 100, without having to pass said terrain segment 130.

In some embodiments, the vehicle 100 may be prohibited from stopping in the terrain segment 130 e.g. when it is not possible to go around the terrain segment 130.

According to some embodiments, the route planning may comprise allowing passing of an insufficient bearing capacity terrain segment 130 coordinate associated with a softness value lower than a threshold limit, but disallowing stopping; and disallowing passing of the insufficient bearing capacity terrain segment 130 coordinate associated with a softness value exceeding the threshold limit.

The planning may be made by allowing passage over the terrain segment 130, which is otherwise to be avoided, when the determined 603 environmental temperature is lower than a threshold temperature limit and the ground may then be more supportive of a vehicle.

The previously described steps 401-410 and/or steps 601-604 to be performed in the control unit 210 may be implemented through the one or more processors 520 within the control unit 210, together with a computer program product for performing at least some of the functions of the steps 401-410 and/or steps 601-604. Thus, a computer program product, comprising instructions for performing the steps 401-410 and/or steps 601-604 in the control unit 210 may perform the methods 400, 600 comprising at least some of the steps 401-410 and/or steps 601-604 for ground bearing capacity analysis and/or route planning of a vehicle 100, when the computer program is loaded into the one or more processors 520 of the control unit 210.

The computer program product mentioned above may be provided for instance in the form of a data carrier carrying computer program code for performing at least some of the steps 401-410 and/or steps 601-604 according to some embodiments when being loaded into the one or more processors 520 of the control unit 210. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 210 remotely, e.g., over an Internet or an intranet connection.

The terminology used in the description of the embodiments as illustrated in the accompanying drawings is not intended to be limiting of the described methods 400, 600; the control unit 210; the computer program, the vehicle 100 and/or the vehicle external structure. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit, e.g. a processor, may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A control unit for a vehicle, the vehicle having a sensor, the control unit comprising a processor, a memory, and a receiving circuit configured for receiving a set of signals from the sensor; wherein the control unit is configured to:
   while the vehicle is moving forward in a driving direction toward a terrain segment ahead of the vehicle,
   a) determine a shape of the terrain segment ahead of the vehicle that is to be moved on ground at the terrain segment, based on sensor measurements obtained from the sensor mounted in or on the vehicle;
   b) predict a distance between the sensor of the vehicle and the ground at the terrain segment based on the determined shape of the terrain segment ahead of the vehicle, wherein the predicted distance represents a distance that would occur if the vehicle drove on top of the determined shape;
   c) obtain, from the sensor, a measure of a distance between the sensor of the vehicle and the ground; and
   d) determine that the terrain segment is to be avoided by the vehicle due to insufficient bearing capacity of the ground at the terrain segment when the predicted distance between the sensor and the ground exceeds the measured distance between the sensor and the ground, and
   wherein the control unit is configured to move the vehicle away from the terrain segment when it is determined that the terrain segment is to be avoided by the vehicle due to insufficient bearing capacity of the ground at the terrain segment.

2. The control unit according to claim 1, further configured to:
   establish a geographical position of the terrain segment that has been determined to be avoided based on information obtained from a positioning device in the vehicle based on one or more satellite navigation systems; and
   store coordinates of the established geographical position in a database, and the stored coordinates are associated with information concerning the insufficient bearing capacity of the terrain segment to be avoided.

3. The control unit according to claim 2, further configured to:
   estimate a softness value of the determined terrain segment that is determined to be avoided based on a difference in size between the predicted distance between the sensor and the ground and the measured distance between the sensor and the ground, and also based on an axle load of the vehicle and on a wheel shape of the vehicle; and the estimated softness value is stored and is associated with the stored coordinates of the established geographical position in the database.

4. The control unit according to claim 1, further configured to: prohibit the vehicle to stop at the terrain segment when it has been determined that the terrain segment is to be avoided by the vehicle.

5. The control unit according to claim 2, further configured to:
   determine a moment in time to be stored and storing the determined moment in time to be associated with the stored coordinates of the established geographical position stored in the database; and
   deleting stored information from the database when a predetermined time period has passed after the determined moment in time.

6. A method of operating a control unit of a vehicle, the vehicle having a sensor, the control unit comprising a processor, a memory, and a receiving circuit configured for receiving a set of signals from the sensor, wherein the method comprises steps of:
   while the vehicle is moving forward in a driving direction toward a terrain segment ahead of the vehicle,
   a) determining with the control unit a shape of a terrain segment ahead of the vehicle, based on sensor measurements of the sensor mounted in or on the vehicle;
   b) predicting with the control unit a predicted distance between the sensor of the vehicle and ground at the terrain segment based on the determined shape of the terrain segment ahead of the vehicle, wherein the predicted distance represents a distance that would occur if the vehicle drove on top of the determined shape;
   and when the vehicle has moved into the terrain segment,
   c) measuring with the control unit a distance between the sensor of the vehicle and the ground;
   d) determining that the terrain segment is to be avoided by the vehicle due to insufficient bearing capacity of the ground at the terrain segment when the predicted distance between the sensor and the ground exceeds the measured distance between the sensor and the ground; and
   e) moving the vehicle, with the control unit, away from the terrain segment when it is determined that the terrain segment is to be avoided by the vehicle due to insufficient bearing capacity of the ground at the terrain segment.

7. The method according to claim 6, further comprising:
   establishing a geographical position of the terrain segment that has been determined to be avoided based on information obtained from a positioning device in the vehicle based on one or more satellite navigation systems; and
   storing coordinates of the established geographical position in a database, the coordinates being associated with information concerning the insufficient bearing capacity for the vehicle of the terrain segment to be avoided.

8. The method according to claim 7, further comprising:
estimating a softness value of the determined terrain segment which is determined to be avoided, based on a difference in size between the predicted distance between the sensor and the ground and the measured distance between the sensor and the ground; and based on axle load of the vehicle and on a wheel shape of the vehicle; and
storing the estimated softness value associated with coordinates of the established geographical position in the database.

9. The method according to claim 6, further comprising:
prohibiting the vehicle to stop at the terrain segment, which is determined to be avoided.

10. The method according to claim 7, further comprising:
determining a moment in time to be stored and storing the determined moment in time, associating the determined moment in time with coordinates of the established geographical position stored in the database; and
deleting stored information from the database when a predetermined time period has passed after the determined moment in time.

11. A system for ground bearing capacity analysis for a vehicle, wherein the system comprises:
the control unit according to claim 1; and
the sensor configured to measure a distance from the vehicle to the ground on which the vehicle is located.

12. The system according to claim 11, further comprising:
a database, configured to store coordinates of the established geographical position of the terrain segment, associated with information concerning an insufficient bearing capacity of the terrain segment.

13. A computer program product comprising a non-transitory recording medium, and a computer program stored on the recording medium;
the computer program comprising program code for performing the method according to claim 6, when the computer program is executed in a control unit.

14. A vehicle comprising the control unit according to claim 1.

* * * * *